(12) United States Patent
Orbach

(10) Patent No.: US 8,819,398 B2
(45) Date of Patent: Aug. 26, 2014

(54) VARIABLE LENGTH STAGES IN A PIPELINE

(75) Inventor: Yair Orbach, Shomron (IL)

(73) Assignee: LSI Corporation, San Jose, CA (US)

( * ) Notice: Subject to any disclaimer, the term of this patent is extended or adjusted under 35 U.S.C. 154(b) by 1207 days.

(21) Appl. No.: 12/146,545

(22) Filed: Jun. 26, 2008

(65) Prior Publication Data
US 2009/0327670 A1    Dec. 31, 2009

(51) Int. Cl.
*G06F 15/00* (2006.01)
*G06F 7/38* (2006.01)
*G06F 9/00* (2006.01)
*G06F 9/44* (2006.01)
*G06F 9/38* (2006.01)

(52) U.S. Cl.
CPC ............ *G06F 9/3869* (2013.01); *G06F 9/3867* (2013.01)
USPC ....................................................... 712/229

(58) Field of Classification Search
None
See application file for complete search history.

(56) References Cited

U.S. PATENT DOCUMENTS 7,076,682 B2 *   7/2006   Jacobson ...................... 713/600
2008/0133947 A1 *   6/2008   Shimada et al. .............. 713/320

OTHER PUBLICATIONS

Yao et al.; Program Phase Detection Based Dynamic Control Mechanisms for Pipeline Stage Unification Adoption; ISHPC 2005.*
Koppanalil et al.; A Case for Dynamic Pipeline Scaling; Cases 2002; ACM.*

* cited by examiner

*Primary Examiner* — Corey S Faherty
(74) *Attorney, Agent, or Firm* — Christopher P. Maiorana, PC

(57) ABSTRACT

A circuit having a pipeline and a configuration circuit. The pipeline generally has multiple stages linked in series by registers. The registers may be governed by a clock signal having a first frequency in a first mode and a second frequency in a second mode. The second frequency may be slower than the first frequency. Each stage may have a respective one of multiple first latencies each shorter than a first period of the first frequency. The configuration circuit may be disposed in the pipeline. The configuration circuit generally bypassing selectively a particular register while in the second mode to form a combined stage. The combined stage may (i) comprise a first of the stages adjoining the particular register and a second of the stages adjoining the particular register and (ii) have a second latency shorter than a second period of the second frequency.

21 Claims, 5 Drawing Sheets

VARIABLE LENGTH STAGES IN A PIPELINE

FIELD OF THE INVENTION

The present invention relates to pipeline circuits generally and, more particularly, to a method and/or apparatus for implementing variable length stages in a pipeline.

BACKGROUND OF THE INVENTION

A common method to improve performance of a central processing unit (CPU), whether the CPU is a microcontroller, a digital signal processor or a coprocessor, is by splitting the execution of combinational logic into several steps in a pipeline structure. Referring to FIG. 1, a block diagram of a conventional pipeline 10 is shown. The pipeline 20 may have multiple steps 12a-12d having combinational logic blocks 14a-14d separated by sample registers 16a-16d. Typically, each step 12a-12d is executed in a single clock cycle. The steps 12a-12d divide complex logic having a large propagation delay into small steps, each small step having a short propagation delay. By concatenating the short steps 12a-12d in the pipeline 10 and performing all of the step 12a-12ds at every clock cycle, each step working on different data, the overall performance is measured as an execution set at every clock cycle. A gain in performance is achieved by accelerating the clock from a low frequency appropriate to perform the entire complex logic to a high frequency sufficient for the slowest step 12a-12d in the pipeline 10. A side effect is that a latency of N cycles is created for a pipeline of depth N.

Extending the depth of the pipeline 10 is limited by three factors. First, deeper pipelines (more stages) increase the overall complexity that increases risk and logic area. Second, splitting an operation that could be done in a single cycle into several cycles involves some power consumption penalty. Furthermore, a latency-caused performance penalty occurs at each change-of-flow in a software program propagating through the pipeline thus reducing the performance gain achieved by the clock frequency increase.

Many conventional pipelined systems operate in several modes, some for power saving. In some cases, parts of the logic are stopped or even disconnected from power supplies to reduce power consumption. In other low power mode cases, all of the sub-blocks continue to operate but in a reduced load. In such cases, the frequency of operation is reduced so that the system consumes less power.

SUMMARY OF THE INVENTION

The present invention concerns a circuit having a pipeline and a first configuration circuit. The pipeline generally has a plurality of stages linked in series by a plurality of registers. The registers may be governed by a clock signal having (i) a first frequency in a first mode and (ii) a second frequency in a second mode. The second frequency may be slower than the first frequency. Each of the stages may have a respective one of a plurality of first latencies each shorter than a first period of the first frequency. The first configuration circuit may be disposed in the pipeline. The first configuration circuit generally bypassing selectively a first particular one of the registers while in the second mode to form a first combined stage. The first combined stage may (i) comprise a first of the stages adjoining the first particular register and a second of the stages adjoining the first particular register and (ii) have a second latency shorter than a second period of the second frequency.

The objects, features and advantages of the present invention include providing a method and/or apparatus for implementing variable length stages in a pipeline that may (i) reduce a power consumption in a low-frequency mode compared with a full-frequency mode, (ii) perform all logic operations while in the low-frequency mode and/or (iii) combine two or more fast stages while in the low-frequency mode.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally enables altering stage lengths in a pipeline processor under the direction of one or more control signals. Operating in a full speed mode, all of the stages in the pipeline may be isolated from each other by sampling logic operated at a full clock speed. The full speed mode may use all N steps available in the pipeline thus enabling a best performance. In a bypass mode, some stages may be combined by bypassing particular sampling logic. Since the combined stages generally have a longer latency than the individual stages, the clock speed may be reduced in the bypass mode to provide more time to complete the combined operations.

When the bypass mode is active, the impact of individual stage latencies on the overall performance of the pipeline is generally reduced due to the shortened pipeline. The combined stages may enable the pipeline to run at a lower frequency and thus save power. Additional power savings may be achieved by reducing or removing power to the bypassed sampling logic.

Figure 1:
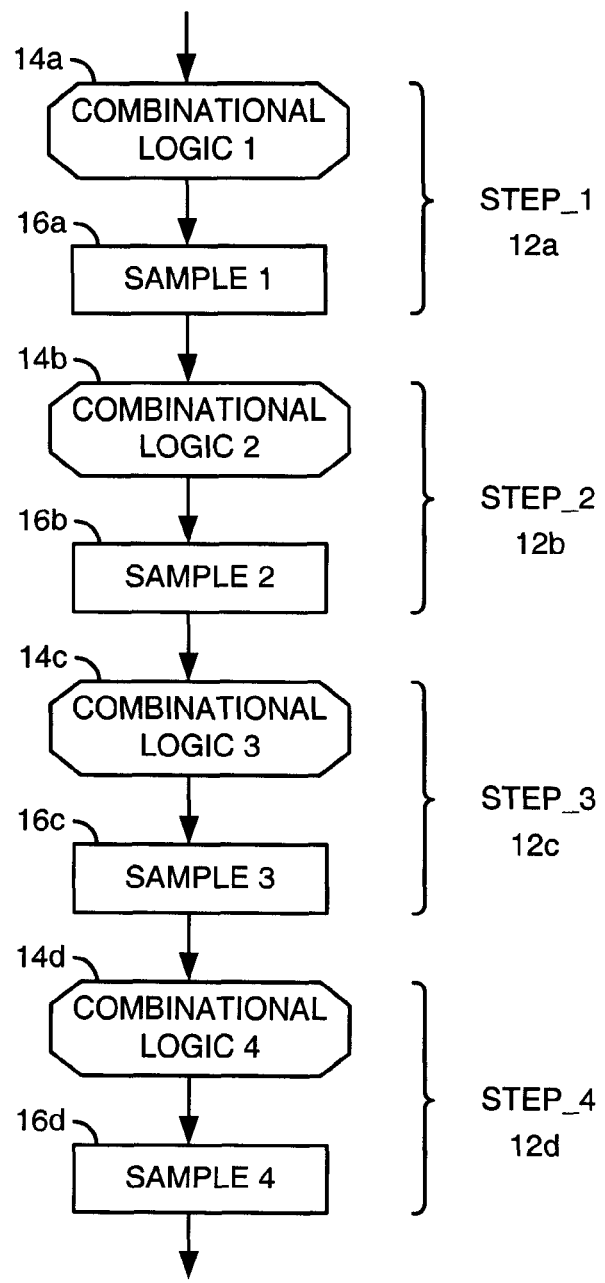
FIG. 1 is a block diagram of a conventional pipeline.
Figure 2:
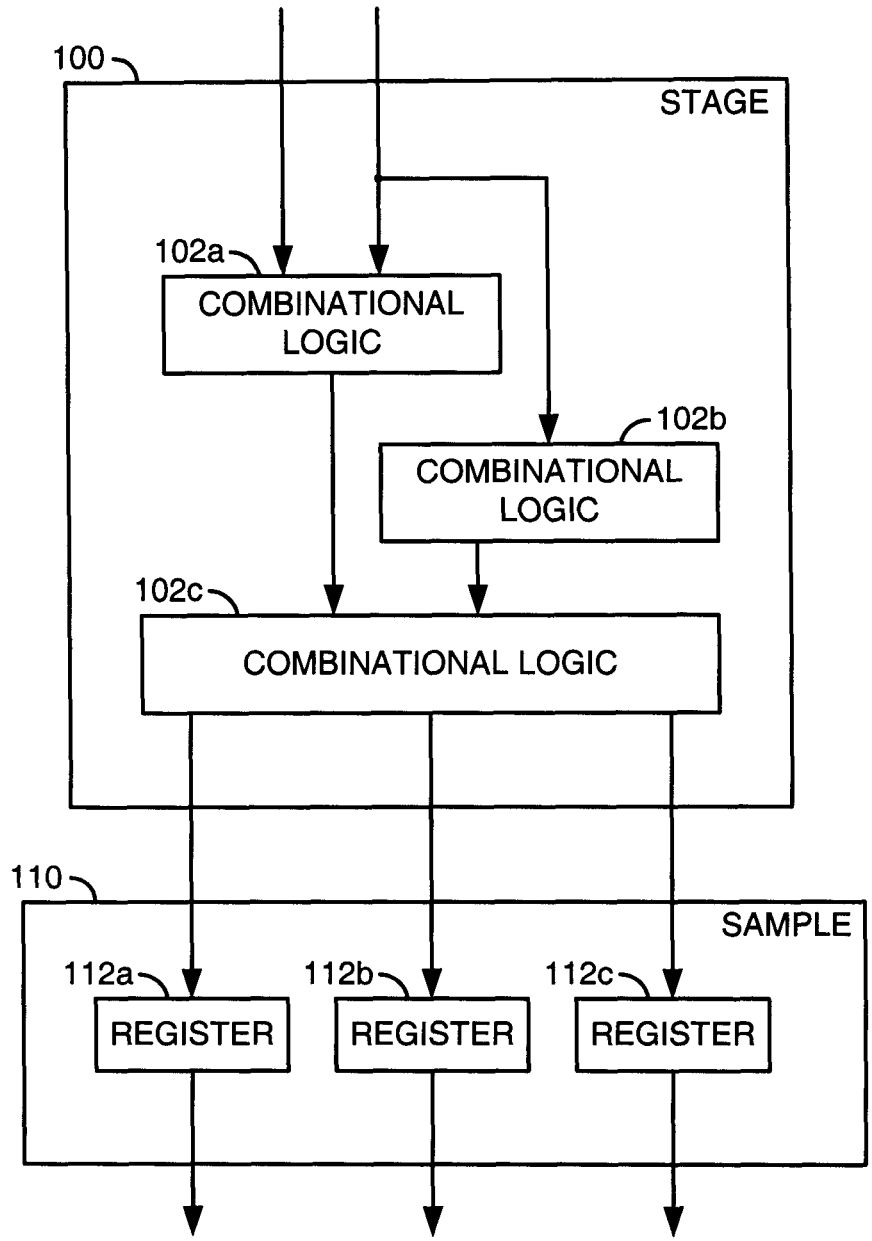
FIG. 2 is a block diagram on an example implementation of a stage and a sample logic of a pipeline.

Referring to FIG. 2, a block diagram on an example implementation of a stage 100 and a sample logic 110 of a pipeline is shown. The stage 100 generally comprises one or more combinational logic blocks (or modules) 102a-102c. The sample stage 110 generally comprises one or more registers 112a-112c. An actual number of combinational logic blocks 102a-102c may vary from stage to stage depending on the functions that the stage is designed to perform. A total number of registers 112a-112d and a bit-width of the individual registers 112a-112c may vary from stage to stage depending on the number and size of the data elements generated and presented by the combinational logic blocks 102a-102c.

Figure 3:
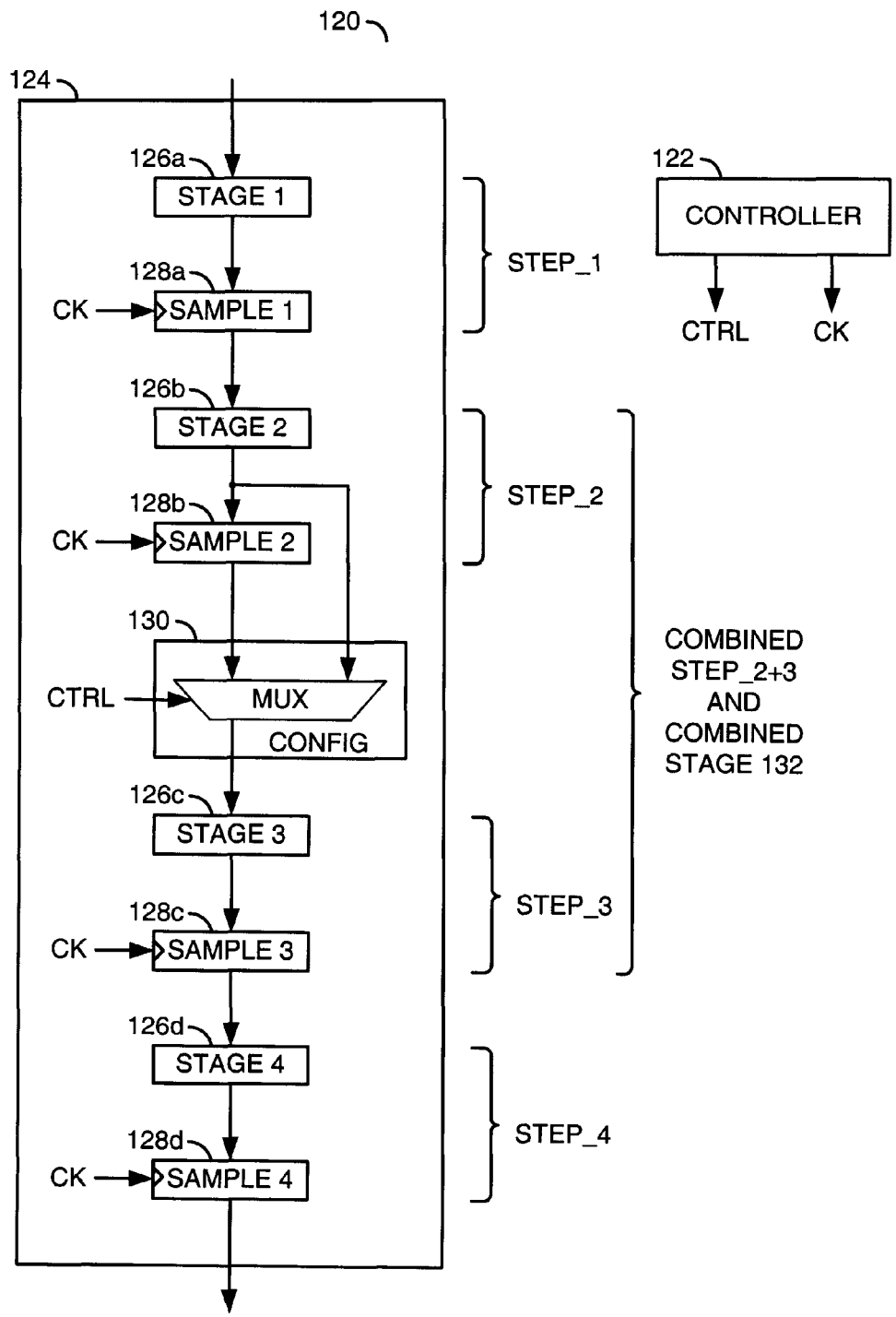
FIG. 3 is a block diagram of an example implementation of a circuit in accordance with a preferred embodiment of the present invention.

Referring to FIG. 3, a block diagram of an example implementation of a circuit 120 is shown in accordance with a preferred embodiment of the present invention. The circuit (or apparatus) 120 may implement a processor. The processor may comprise a central processing unit (CPU), a microcontroller, a microprocessor, a digital signal processor, a coprocessor, a general purpose processor, a reduced instruction set processor, a complex instruction set processor or other logic processing circuit. Other types of logic circuits 120 may be implemented to meet the criteria of a particular application.

The circuit 120 generally comprises a circuit (or module) 122 and a circuit (or module) 124. A clock signal (e.g., CK) may be generated by the circuit 122 and presented to the circuit 124. A control signal (e.g., CTRL) may also be generated by the circuit 122 and presented to the circuit 124.

The circuit 122 generally implement a controller circuit. The circuit 122 may be operational to control the circuit 124 in two or more modes using the signal CTRL. In each mode, the circuit 122 may generate the signal CK at a different frequency corresponding to a slowest stage of the circuit 124 in the given mode. The signal CTRL may be a single signal or represent multiple control signals.

The circuit 124 may implement a pipeline circuit (or processor). The circuit 124 is generally operational to perform a series of logical operations to transform input information into output information. The information may comprise data and/or software code. The circuit 124 may perform the same series of logical operations in each of the various modes commanded by the circuit 122. A speed at which the circuit 124 operates generally varies in the different modes. A power consumed by the circuit 124 may also vary in the different modes. For example, the circuit 124 may operate at a high performance level and a high-power consumption level in a full speed mode. In another mode, the circuit 124 may operate at a reduced performance level and with a reduced power consumption. In a low speed mode, the circuit 124 may operate at a lower performance level and with a lower power consumption.

The circuit 124 generally comprises multiple stages (or modules) 126a-126d, multiple circuits (or modules) 128a-128d and one or more circuits (or modules) 130. The stages 126a-126d and the circuits 128a-128d may be arranged in series with each stage (e.g., stage 126a) feeding a subsequent stage (e.g., stage 126b) through a given one of the circuits (e.g., 128a). Each of the circuits 130 may be disposed between adjoining stages (e.g., circuit 130 may be located between the stages 126b and 126c). The signal CK may be received by each of the circuits 128a-128d. The signal CTRL may be received by the circuit 130. Other numbers of stages 126a-126d may be implemented to meet the criteria of a particular application.

The stages 126a-126d may be formed as one or more combinational logic blocks that perform a specific operation. An example of a generic stage is generally illustrated in FIG. 2. Each stage 126a-126d may introduce a delay in propagating information (e.g., data and/or software) through the logic. The delay is generally designed to be shorter than a single period of the signal CK while the signal CK is operating at a fastest speed.

The circuits 128a-128d may implement sample circuits. The circuits 128a-128d are generally operational to sample information received at input ports on a first edge (e.g., a rising edge) of the signal CK. The sampled information may be presented from the circuits 128a-128d at an output port on a second edge (e.g., a falling edge) of the signal CK. In some embodiments, the circuits 128a-128d may sample the information at the input ports on a given edge of the signal CK and present the information at the output ports a propagation delay after the sampling. The circuits 128a-128d are generally implemented as one or more registers, as illustrated in FIG. 2.

Each of the circuits 128a-128d that is associated with one of the circuits 130 may include a low power mode. When operating in the low power mode, the circuits 128a-128d may ignore the signal CK because sampling, storing and presenting information may be unnecessary. For example, while the circuit 130 is bypassing the circuit 128b, the circuit 128b may ignore the information received from the stage 126b. While the circuit 130 is bypassing the circuit 128b, the information presented at the output port of the circuit 128b is not received by the stage 126c.

The circuits 130 may be implemented as a configuration control circuits. The circuits 130 are generally operational to selectively bypass or not bypass associated circuits 128a-128d (e.g., the circuit 130 bypasses/not bypasses the circuit 128b in the example circuit 124). Selection of bypassing or not bypassing may be controlled by the signal CTRL. In some embodiments, each of the circuit 128a-128d may comprise one or more multiplexers. Other circuits arrangements may be implemented to meet the criteria of a particular application.

In the full speed mode, the circuits 130 may be configured by the signal CTRL to avoid bypassing the corresponding circuits 128a-128d. As such, each one of the stages 126a-126d and a corresponding one of the circuits 128a-128d may form a single step (e.g., STEP_1 to STEP_4) performed by the circuit 124. With the signal CK operating at a full frequency (e.g., 100 Megahertz (MHZ), each of the steps may be performed in a single clock cycle—a single period of the signal CK (e.g., 10 nanoseconds (ns)).

In a low speed mode, each circuit 130 may be configured by the signal CTRL to bypass the corresponding circuit 128a-128d. Therefore, some or all of the adjacent stages 126a-126d may be coupled together by a particular circuit 130 in the bypass mode to form one or more combined stages. For example, the circuit 130 may create a combined stage 132 with the stages 126b and 126c. A latency of the combined stage 132 may be a sum of the latencies of the individual staged 126b and 126c and a latency of the circuit 130. The combined stage 132 may be operational to perform a combined step (e.g., STEP_2+3) of the circuit 124. The combined step is generally a combination of the individual steps (e.g., STEP_2 and STEP_3). To accommodate the longer latency of the combined stage 132, the signal CK may be reduced to a low frequency (e.g., 50 MHZ) such that the combined step may be completed in a single clock cycle—a single period of the signal CK (e.g., 20 ns).

Figure 4:
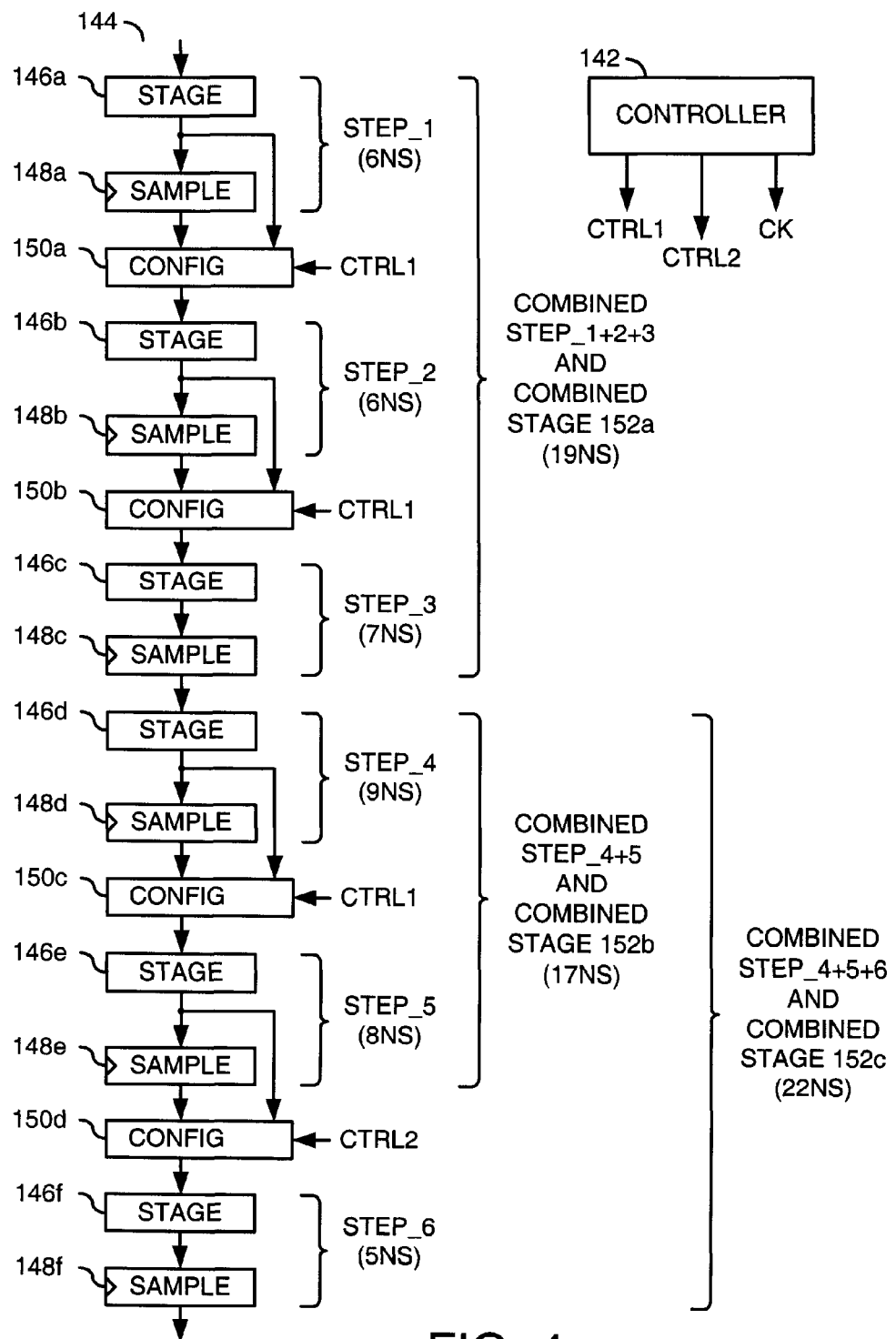
FIG. 4 is a block diagram of an example implementation of another circuit implementing the present invention.

Referring to FIG. 4, a block diagram of an example implementation of another pipeline 144 implementing the present invention is shown. The pipeline (or circuit) 144 generally comprises multiple stages 146a-146f, multiple circuits 148a-148f and multiple circuits 150a-150d. Each of the circuits 148a-148f may be similar to the circuits 128a-128d and 112a-112c. Each of the circuits 150a-150d may be similar to the circuit 130. The signal CTRL may be implemented as multiple independent signals (e.g., CTRL1 and CTRL2). A circuit 142 may provide the signal CK, the signal CTRL1 and the signal CTRL2.

By way of example, the circuit 150a may correspond to the circuit 148a to selectively link/isolate the stages 146a and 146b. The circuit 150b may correspond to the circuit 148b to selectively link/isolate the stages 146b and 146c. The circuit 150c may correspond to the circuit 148c to selectively link/isolate the stages 146d and 146e. The circuit 150d may correspond to the circuit 148f to selectively link/isolate the stages 146e and 146f.

While the circuit 144 is operating in a first (full speed) mode (CTRL1=CTRL2=non-bypass), each of the stages 146a, 146b and 146c may be separated from each other by the circuits 148a and 148b thereby forming three steps (e.g., STEP_1, STEP_2 and STEP_3) of the circuit 144. Likewise, the stages 146d and 146e may be separated from each other by the circuit 148d to form two steps (e.g., STEP_4 and STEP_5). The stage 146f and the circuit 148f may form another step (e.g., STEP_6).

While the circuit 144 is operating in a second (intermediate speed) mode (CTRL1=bypass, CTRL2=non-bypass), both of the circuits 150a-150c may be configured to bypass the respective circuits 148a, 148b and 148d. In bypassing the circuits 148a and 148b, the stages 146a, 146b and 146c may be directly linked to form a combined stage 152a that performs a combined step (e.g., STEP_1+2+3). Bypassing the circuit 148d generally links the stages 146d and 146de to create a combined stage 152b that performs a combined step (e.g., STEP_4+5). The circuit 150d may remain in a non-bypass condition thereby keeping the stage 146f separated from the combined stage 152b. Therefore, the circuit 144 may have only three steps (e.g., STEP_1+2+3, STEP_4+5 and STEP_6).

To account for the longer latencies of the combined steps, the clock frequency may be lower in the second mode than in the first mode. In the above example, a sum of the latencies of the stages 146a, 146b and 146c may be shorter than a single clock cycle (single clock period) of the signal CK in the second mode. Likewise, a sum of the latencies of the stages 146d and 146e may be shorter than the single clock cycle of the signal CK. Since the stage 146f is part of a single step in both the first mode and the second mode, the latency of the stage 146f is shorter than the single clock cycle of the signal CK in the second mode.

While operating in a third (low speed) mode (CTRL1=CTRL2=bypass), the circuit 150d may be switched to the bypass condition. By bypassing the circuit 148f, the stage 146f may be connected with the combined stage 152b to create a combined stage 152c performing a combined step (e.g., STEP_4+5+6). The latency of the combined stage 152c may be accommodated by lowering the clock frequency even further in the third mode.

Consider an example first mode where the clock frequency is 100 MHz. Each of the stages 146a-146f should have a latency of less than 10 ns in order to complete the respective operations in a single clock cycle. Example latencies may be 6 ns for stage 146a, 6 ns for stage 146b, 7 ns for stage 146c, 9 ns for stage 146d, 8 ns for stage 146e and 5 ns for stage 146f. When the clock frequency is reduced to 50 MHz in the second mode, each independent stage and combined stage may have 20 ns available to complete the respective operations. In the above example, the latencies of the first combined stage 152a (19 ns=6 ns+6 ns+7 ns), the second combined stage 152b (17 ns=9 ns+8 ns) and the last stage 152c (5 ns) are sufficiently short to be completed in a single clock cycle (20 ns). The clock frequency may be reduced to 25 MHz in the third mode thus allowing the stages and combined stages 40 ns to complete the respective functions. Therefore, the circuit 144 may operate as two combined stages 152a and 152c. The latency of the combined stage 152a may remain at 19 ns. The latency of the combined stage 152c may be 22 ns, which is quicker than the available 40 ns. As such, the circuit 144 (and 124) may operate with one or more combined stages while in modes other than the full speed mode. Furthermore, each of the combined stages may comprise a different number of the individual stages. Still further, the size of the combined stages may vary in different modes.

Figure 5:
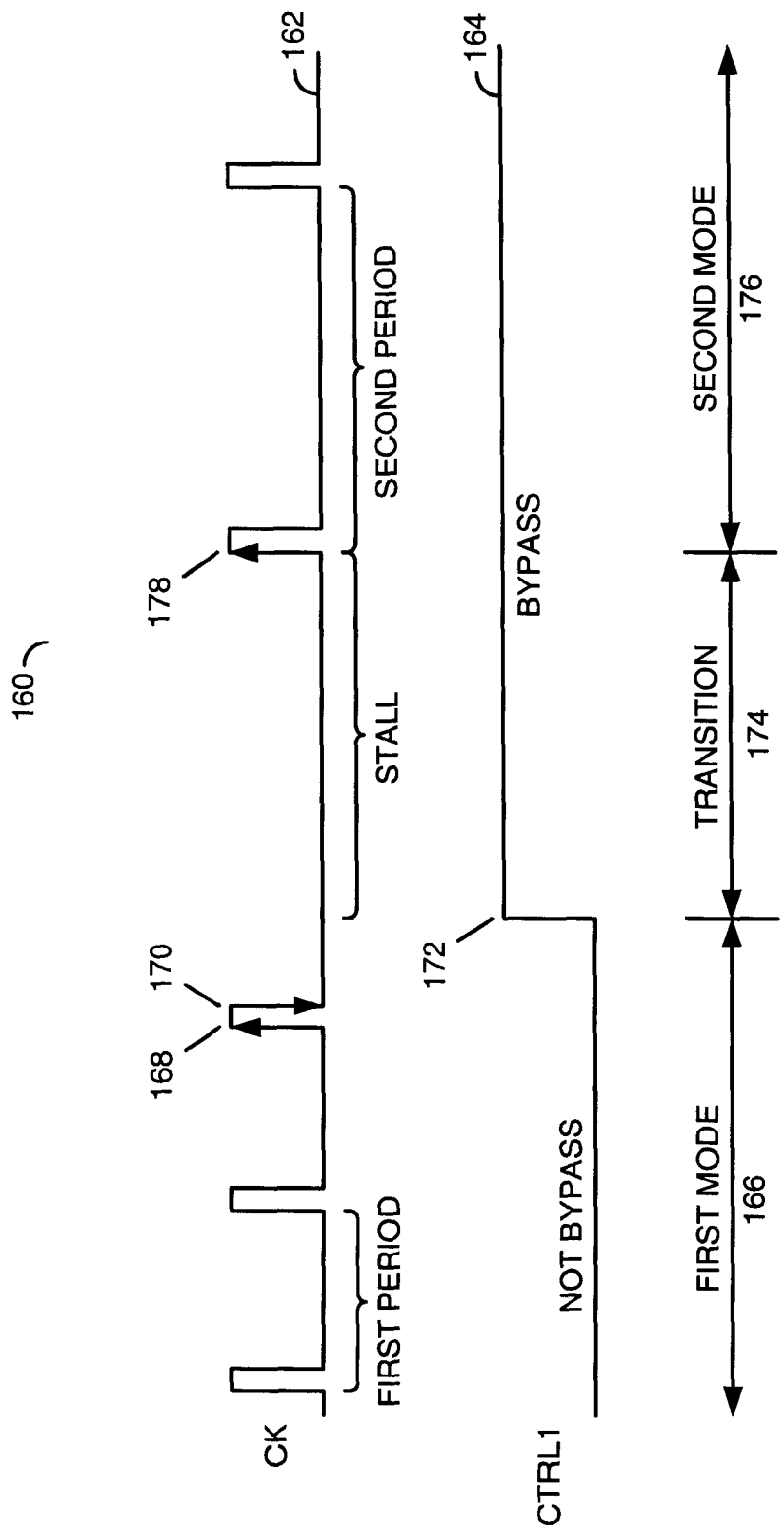
FIG. 5 is a graph of example signal waveforms.

Referring to FIG. 5, a graph 160 of example signal waveforms of the circuit 144 is shown. The graph generally comprises a waveform 162 of the signal CK and a waveform 164 of the signal CTRL1. While in the first mode 166, the signal CK may have a first frequency and the signal CTRL1 may be in a non-bypass state. The circuits 148a-148f may respond to the signal CK by sampling input data on a rising edge (e.g., edge 168) of the signal CK. The sampled data may be presented at an output port on a subsequent falling edge (e.g., edge 170) of the signal CK.

When the signal CTRL1 transitions from the non-bypass state to the bypass state (e.g., at the time 172), the circuit 144 may enter a transition mode 174. During the transition mode, the circuit 142 may freeze or halt the signal CK for a given period to allow time for the information originally destined for the just-bypassed circuits 148a-148f to propagate around the bypassed circuits 148a-148f to the end of the newly-formed combined stages. The given period is generally at least a single cycle of the lower clock frequency of the second mode.

At the end of the transition mode 174, the circuit 142 may resume toggling the signal CK at the second frequency. By the start of the second mode 176, all signals should have had sufficient time to reach the end of the combined stages. As such, all of the signals in the pipeline 144 may be sampled 178 by the non-bypassed circuits 148a-148f. Thereafter, the second mode 176 may proceed as normal with the signal CK at the second frequency and the signal CTRL1 in the bypass state. A clock-slowing transition of the circuit 124 may be achieved in a similar manner.

A transition from the second mode back to the first mode may be performed when the system is indifferent to a command loss or duplication. In some embodiments, the pipeline may be filled with non-operation (NOP) commands to avoid any undetermined conditions that may be created when the bypassed circuits 148a-148f become non-bypassed. In a similar fashion, the transition 174 from the first (full speed) mode 166 to the second (slower) mode 176 may involve filling the pipeline with NOPs at the end of the first mode 166. In such a case, the transition mode 174 may be reduced in length, or even eliminated.

Table 1 generally summarizes and compares the benefits of the common techniques (middle two columns) and the present invention (right column).

TABLE 1

| | Long Pipeline | Short Pipeline | Variable Length Pipeline |
| --- | --- | --- | --- |
| Timing constraints | Loose | Tight | Loose |
| Change-of-Flow impact | Large | Small | Large when operated at high frequency; Small when operated at low frequency |
| At maximum performance | Meets criteria | Meets criteria only if uses edge technology which is expensive and consumes high power | Meets criteria |
| At periods of smaller load | Frequency lowering is limited by the change-of-flow impact | Allows maximum frequency lowering (and maximum power saving) | Allows maximum frequency lowering (and maximum power saving) |

The functions performed by the diagrams of FIGS. 2-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A circuit comprising:
    a pipeline having a plurality of stages linked in series by a plurality of registers, said registers being governed by a clock signal having (i) a first frequency in a first mode and (ii) a second frequency in a second mode;
    a first configuration circuit disposed in said pipeline, said first configuration circuit bypassing a first particular one of said registers while in said second mode to form a first combined stage, said first combined stage comprising a first of said stages adjoining said first particular register and a second of said stages adjoining said first particular register; and
    a controller configured to operate said pipeline in a third mode in response to an assertion of a control signal, wherein (i) said third mode transitions said pipeline from said first mode to said second mode, (ii) said clock signal is halted during all of said third mode, (iii) said third mode is at least as long as a period of said second frequency and (iv) said pipeline is filled with a plurality of non-operation commands by an end of said first mode in preparation to enter said third mode.

2. The circuit according to claim 1, wherein said control signal switches said first configuration circuit between (i) not bypassing said first particular register in said first mode and (ii) bypassing said first particular register in said second mode.

3. The circuit according to claim 1, wherein said third mode is longer than said period of said second frequency.

4. The circuit according to claim 1, further comprising a second configuration circuit disposed in said pipeline, said second configuration circuit bypassing selectively a second particular one of said registers such that said first combined stage comprises (i) said first stage, (ii) said second stage adjoining said second particular register and (iii) a third of said stages adjoining said second particular register.

5. The circuit according to claim 4, wherein said first combined stage has a latency shorter than said period of said second frequency.

6. The circuit according to claim 4, wherein (i) said clock signal has a third frequency in a fourth mode, (ii) said third frequency being slower than said second frequency and (iii) said second configuration circuit (a) does not bypass said second particular register in said second mode and (b) bypasses said second particular register in said fourth mode.

7. The circuit according to claim 6, wherein said first combined stage has a latency in said fourth mode, said latency being shorter than a period of said third frequency.

8. The circuit according to claim 1, further comprising a second configuration circuit disposed in said pipeline, said second configuration circuit bypassing selectively a second particular one of said registers to form a second combined stage, said second combined stage (i) comprising a third of said stages adjoining said second particular register and a fourth of said stages adjoining said second particular register and (ii) having a latency shorter than said period of said second frequency.

9. The circuit according to claim 1, wherein a power consumption of said pipeline is lower in said second mode than in said first mode.

10. The circuit according to claim 1, wherein said pipeline forms a portion of a central processing unit.

11. A method to vary a length of a plurality of stages in a pipeline, comprising the steps of:
    (A) operating said pipeline in a first mode such that said stages are linked in series by a plurality of registers, said registers being governed by a clock signal having a first frequency in said first mode;
    (B) operating said pipeline in a second mode in which said clock signal has a second frequency;
    (C) bypassing a first particular one of said registers while in said second mode to form a first combined stage, said first combined stage comprising a first of said stages adjoining said first particular register and a second of said stages adjoining said first particular register; and
    (D) operating said pipeline in a third mode in response to an assertion of a control signal, wherein (i) said third mode transitions said pipeline from said first mode to said second mode, (ii) said clock signal is halted during all of said third mode, (iii) said third mode is at least as long as a period of said second frequency and (iv) said pipeline is filled with a plurality of non-operation commands by an end of said first mode in preparation to enter said third mode.

12. The method according to claim 11, wherein said control signal causes switching between (i) not bypassing said first particular register in said first mode and (ii) bypassing said first particular register in said second mode.

13. The method according to claim 11, wherein said third mode is longer than said period of said second frequency.

14. The method according to claim 11, further comprising the step of:
    bypassing selectively a second particular one of said registers such that said first combined stage comprises (i) said first stage, (ii) said second stage adjoining said second particular register and (iii) a third of said stages adjoining said second particular register.

15. The method according to claim 14, wherein said first combined stage has a latency shorter than said period of said second frequency.

16. The method according to claim 14, wherein (i) said clock signal has a third frequency in a fourth mode, (ii) said third frequency being slower than said second frequency and (iii) said control signal causes switching between (a) not bypassing said second particular register in said second mode and (b) bypassing said second particular register in said fourth mode.

17. The method according to claim 16, wherein said first combined stage has a latency in said fourth mode, said latency being shorter than a period of said third frequency.

18. The method according to claim 11, further comprising the step of:

bypassing selectively a second particular one of said registers to form a second combined stage, said second combined stage (i) comprising a third of said stages adjoining said second particular register and a fourth of said stages adjoining said second particular register and (ii) having a latency shorter than said period of said second frequency.

19. The method according to claim 11, wherein a power consumption of said pipeline is lower in said second mode than in said first mode.

20. A processor comprising:

means for (i) operating a pipeline in a first mode such that a plurality of stages in said pipeline are linked in series by a plurality of registers, said registers being governed by a clock signal having a first frequency in said first mode and (ii) operating said pipeline in a second mode in which said clock signal has a second frequency;

means for bypassing a first particular one of said registers while in said second mode to form a first combined stage, said first combined stage comprising a first of said stages adjoining said first particular register and a second of said stages adjoining said first particular register; and means for operating said pipeline in a third mode in response to an assertion of a control signal, wherein (i) said third mode transitions said pipeline from said first mode to said second mode, (ii) said clock signal is halted during all of said third mode, (iii) said third mode is at least as long as a period of said second frequency and (iv) said pipeline is filled with a plurality of non-operation commands by an end of said first mode in preparation to enter said third mode.

21. The circuit according to claim 1, wherein said pipeline is filled with said non-operation commands by an end of said second mode in preparation to enter a fourth mode that transitions said pipeline from said second mode to said first mode.

* * * * *